(12) United States Patent
Singer (10) Patent No.: US 11,492,092 B2
(45) Date of Patent: Nov. 8, 2022

(54) AIRCRAFT HAVING SUPPORTING STRUCTURE AND GAS-FILLED ENVELOPE

(71) Applicant: Hybrid-Airplane Technologies GmbH, Baden-Baden (DE)

(72) Inventor: Csaba Singer, Baden-Baden (DE)

(73) Assignee: HYBRID-AIRPLANE TECHNOLOGIES GMBH, Baden-Baden (DE)

( * ) Notice: Subject to any disclaimer, the term of this patent is extended or adjusted under 35 U.S.C. 154(b) by 551 days.

(21) Appl. No.: 16/302,771

(22) PCT Filed: May 31, 2017

(86) PCT No.: PCT/EP2017/063221
§ 371 (c)(1),
(2) Date: Nov. 19, 2018

(87) PCT Pub. No.: WO2017/207666
PCT Pub. Date: Dec. 7, 2017

(65) Prior Publication Data
US 2019/0152576 A1  May 23, 2019

(30) Foreign Application Priority Data
May 31, 2016  (DE) .................. 10 2016 110 058.7

(51) Int. Cl.
*B64B 1/08* (2006.01)
*B64B 1/18* (2006.01)
*B64B 1/20* (2006.01)
*B64B 1/32* (2006.01)
*B64B 1/58* (2006.01)

(52) U.S. Cl.
CPC .................. *B64B 1/18* (2013.01); *B64B 1/08* (2013.01); *B64B 1/20* (2013.01); *B64B 1/32* (2013.01); *B64B 1/58* (2013.01); *B64B 2201/00* (2013.01)

(58) Field of Classification Search
CPC .................................. B64B 1/06; B64B 1/08
See application file for complete search history.

(56) References Cited

U.S. PATENT DOCUMENTS

| 4,113,206 A |   | 9/1978 | Wheeler |             |
|-------------|---|--------|---------|-------------|
| 5,110,070 A | * | 5/1992 | Hagenlocher | B64B 1/24 |
|             |   |        |         | 244/125     |
| 5,645,248 A | * | 7/1997 | Campbell | B64B 1/00  |
|             |   |        |         | 244/125     |

(Continued)

FOREIGN PATENT DOCUMENTS

| DE | 35 08 101 A1     | 9/1986 |
| DE | 10 2006 028885 A1 | 3/2007 |

(Continued)

OTHER PUBLICATIONS

International Search Report of PCT/EP2017/063221, dated Jan. 9, 2018.

*Primary Examiner* — Joseph W Sanderson
(74) *Attorney, Agent, or Firm* — Collard & Roe, P.C.

(57) ABSTRACT

An aircraft has a supporting structure and a shell that can be filled with a gas and which is tensioned by the supporting structure. The supporting structure includes a plurality of rod or tube-shaped sections which define a circular, oval or polygonal main clamping plane for the shell.

13 Claims, 8 Drawing Sheets

(56) References Cited

U.S. PATENT DOCUMENTS

| | | | | |
|---|---|---|---|---|
| 5,823,468 | A * | 10/1998 | Bothe | B64B 1/18 244/2 |
| 6,056,240 | A * | 5/2000 | Hagenlocher | E04C 3/28 244/125 |
| 7,316,197 | B2 * | 1/2008 | Herrmann | B63B 3/13 114/312 |
| 7,438,261 | B2 * | 10/2008 | Porter | B64B 1/06 244/123.11 |
| 7,866,601 | B2 * | 1/2011 | Balaskovic | B64B 1/10 244/96 |
| 8,033,497 | B2 * | 10/2011 | Kwok | B64B 1/34 244/5 |
| 8,596,571 | B2 * | 12/2013 | Goelet | B64B 1/06 244/30 |
| 8,905,353 | B2 * | 12/2014 | Rawdon | B64B 1/06 244/125 |
| 9,004,397 | B2 * | 4/2015 | Pecnik | B64B 1/58 244/30 |
| 9,102,391 | B2 * | 8/2015 | Brutoco | B64B 1/62 |
| 9,139,278 | B1 | 9/2015 | Roach et al. | |
| 9,266,597 | B1 * | 2/2016 | Pasternak | B64B 1/06 |
| 9,488,630 | B2 * | 11/2016 | Coram | B64F 1/14 |
| 9,623,949 | B2 * | 4/2017 | Heppe | B64C 37/02 |
| 9,789,947 | B2 * | 10/2017 | Glass | B64B 1/66 |
| 9,828,081 | B1 * | 11/2017 | DeVaul | B64B 1/62 |
| 9,845,140 | B2 * | 12/2017 | Crites | B29C 66/843 |
| 10,377,465 | B2 * | 8/2019 | Kempshall | B64B 1/26 |
| 10,988,226 | B2 * | 4/2021 | Brin | B64F 5/10 |
| 2006/0049305 | A1 * | 3/2006 | Porter | B64B 1/06 244/31 |
| 2006/0117675 | A1 * | 6/2006 | Herrmann | B64B 1/08 52/81.1 |
| 2008/0179454 | A1 * | 7/2008 | Balaskovic | B64B 1/06 244/30 |
| 2008/0223986 | A1 * | 9/2008 | Kaye | B64C 1/065 244/119 |
| 2009/0263633 | A1 | 10/2009 | Liggett et al. | |
| 2009/0314880 | A1 | 12/2009 | Rawdon et al. | |
| 2012/0248241 | A1 | 10/2012 | Goelet | |
| 2013/0146703 | A1 * | 6/2013 | Pecnik | B64B 1/08 244/30 |
| 2014/0124625 | A1 * | 5/2014 | Brutoco | B64B 1/20 244/125 |
| 2015/0367928 | A1 * | 12/2015 | Crites | B29D 22/04 244/31 |
| 2016/0023748 | A1 * | 1/2016 | Kempshall | B64C 3/546 244/5 |

FOREIGN PATENT DOCUMENTS

| | | |
|---|---|---|
| FR | 673 934 A | 1/1930 |
| GB | 08754 A | 6/1914 |
| WO | 96/05103 A1 | 2/1996 |
| WO | 2012/025769 A1 | 3/2012 |

\* cited by examiner

AIRCRAFT HAVING SUPPORTING STRUCTURE AND GAS-FILLED ENVELOPE

CROSS REFERENCE TO RELATED APPLICATIONS

This application is the National Stage of PCT/EP2017/063221 filed on May 31, 2017, which claims priority under 35 U.S.C. § 119 of German Application No. 10 2016 110 058.7 filed on May 31, 2016, the disclosure of which is incorporated by reference. The international application under PCT article 21(2) was not published in English.

The invention relates to an aircraft having a supporting structure and an envelope that is tensioned by the supporting structure and can be filled with a gas.

An aircraft of this kind is known from the earlier patent application DE 10 2006 028885 A1 from the inventor of this application.

The object of the invention is to produce a supporting, inflatable structure from simple elements.

The problem with inflatable structures is that an inner static supporting structure has previously been required for "heavy" components projecting from the inflatable structure, which structure is inside the inflatable structure and takes up space there and divides the inner space and is therefore perceived to be disruptive.

The invention solves the above-mentioned problem in that the interior of the envelope does not comprise a wing spar, penetrating the interior, for supporting wings, and in that the entirety of the interior can be used for accommodating a gas cell. The aircraft comprises a volume that can be used in its entirety for accommodating the gas cell and wings that protrude horizontally from the inflatable envelope and do not deform the inflatable envelope.

The supporting structure comprises a connection system consisting of rod or tube portions and connecting parts for receiving one or more end parts of the rod or tube portions, which system is designed such that all the components are involved in supporting the torque acting on the supporting structure by means of the protruding wings (curved "cross-members," annular structure, inflated structure). In addition to the elasticity of CFRP tubes, which are preferably used, distributing the torque to all the components is the main reason why the very thin "crossmembers" (CFRP rods or tubes) do not break and hold the wings.

In order to solve the above-mentioned problem, the combination of features disclosed herein is proposed. Advantageous embodiments and developments as well as preferred uses of the aircraft are also disclosed.

The aircraft according to the invention having a supporting structure and an envelope that is tensioned by the supporting structure and can be filled with gas is characterized in that the supporting structure comprises a plurality of rod or tube portions which define a circular, oval or polygonal main tension plane for the envelope.

Preferably, the end parts of the rod or tube portions are detachably fitted together in pairs by means of a plurality of sleeve elements comprising at least two sleeve parts.

Furthermore, at least one portion of the sleeve elements that are opposite one another in a main tension plane preferably comprises at least one additional sleeve part for receiving end parts of at least one additional rod or tube portion, the additional rod or tube portion arching over the main tension plane for the stabilization thereof.

Furthermore, at least two intersecting rod or tube portions are preferably provided for stabilizing the main tension plane, a frame part being arranged in the intersecting region of these rod or tube portions, which frame part comprises openings for the rod or tube elements.

Furthermore, a blower is preferably arranged on the frame part, which frame part applies compressed air to the interior of the envelope.

Furthermore, downward projecting supporting legs for the aircraft are preferably arranged on the frame part.

Furthermore, functional components, such as control electronics for operating the aircraft, transmitting and/or receiving modules for optical or electromagnetic communication, a camera module or the like, are preferably arranged on the frame part.

Furthermore, a portion of the sleeve elements preferably comprises an additional sleeve part for incorporating an axis of rotation of a wing element that can be adjusted about the axis of rotation and protrudes from the outer periphery of the sleeve.

Furthermore, the sleeve parts of the sleeve elements are preferably oversized with respect to the end parts of the rod or tube parts.

Furthermore, the sleeve parts of the sleeve elements are preferably each overlapped by a securing sleeve arranged on the rod or tube portion.

Furthermore, the rod or tube portions preferably consist of a carbon fiber material.

Furthermore, the envelope is preferably made of an air-impermeable, tear-resistant synthetic fabric material, for example spinnaker material.

Furthermore, the envelope preferably comprises two envelope halves that can be interconnected by means of at least one zipper, which halves are securely interconnected at a short connection region and can be folded apart in a shell-like manner when the at least one zipper is opened.

Furthermore, two zippers that can be actuated in the same or opposite direction are preferably provided, between which zippers, when closed, a tunnel is formed for receiving the rod or tube portions of the supporting structure defining the main tension plane of the envelope.

Furthermore, a communication antenna is preferably incorporated into the material of the envelope or is deposited or rolled thereon.

Furthermore, a hot wire is preferably arranged on the envelope and a gas cell for a lighter-than-air gas that is arranged in the envelope, in order to be able to melt said envelope and cell along an appropriate length if required in order to relieve pressure.

Furthermore, the envelope preferably comprises fastening elements on the inside, for example hook-and-loop fastener parts, for fastening a gas cell for a lighter-than-air gas that is arranged inside the envelope and comprises complementary fastening elements.

Furthermore, the supporting structure preferably comprises connection elements between an upper and a lower region of the envelope that can be deformed and/or longitudinally adjusted, by means of which a modifiable aerodynamic outer contour of the envelope can be produced.

The supporting structure mainly consists of rod or tube portions that are interconnected in the form of a connection system such that they have a stable cohesion in flying operation, but can be nondestructively separated from one another in order to be able to easily transport the aircraft in a dismantled state. The connection system comprises sleeve elements into which a tube portion can be inserted from both sides.

The connection system also comprises securing sleeves, which partially overlap the end parts of the rod or tube portions inserted into the sleeve elements and also overlap the sleeve parts on the outside by means of a further portion. In the main tension plane, the supporting structure substantially has a circular shape. This means that it is not possible to exactly linearly insert the rod or tube portions into the sleeve elements, but rather that the rod or tube portions have a specific, if small, radius in the sleeve parts. Carbon fiber material is very susceptible to indentations. The sleeve parts of the sleeve elements are therefore designed such that the end parts of the rod or tube portions can each be inserted with some backlash. Inside the sleeve parts, the end parts of the rod or tube portions are (very slightly) bent.

This is not the case with the additional securing sleeve. Said sleeve is bonded, by means of a first portion, to the rod or tube portion or connected thereto in another way, such that the securing sleeve is not moveable with respect to the rod or tube portion. Another portion of the securing sleeve overlaps the sleeve part of the sleeve elements. In this case, however, there should be no backlash, but rather an exact fit. It is also conceivable that the securing sleeve is slightly undersized and is pressed against the sleeve part. A frictional connection, optionally also a form-fitting connection, is to be produced by means of locking elements such as complementary grooves and ribs, for example. As a result, a highly stable and bendable connection, which can however be detached if desired, is produced.

The sleeve parts of the sleeve elements may be continuously cylindrical or comprise an inner web which separates the two rod or tube portions that are pushed in from the respective ends.

In a preferred embodiment, five rod or tube portions are fitted together in this way. It is also conceivable that a very large number of correspondingly shorter rods are fitted together. The more rods that are used, the lower the bending radius of each individual rod. This asymptotically comes close to a linear connection system. An advantage of the preferred embodiment is that there is a certain preload, which is beneficial to the cohesion of the rod or tube portions in the connection system.

The preferred embodiment has proven to be effective with rod or tube portion diameters of 8 mm. A variant which uses a rod or tube portion diameter of only 6 mm has also been implemented. In this case, the connection system is designed slightly differently based on experience:

The rod or tube portions having a diameter of 6 mm can be inserted into tube portions having a diameter of 8 mm in a telescopically fitting manner; tube portions having an outer diameter of 8 mm therefore have an inner diameter of 6 mm. In this second variant, the sleeve elements are therefore portions made of 8 mm tube material. The additional securing sleeve can be dispensed with in this case, as the sleeve elements do not comprise any metal material that may damage the notch of the carbon fiber material; instead, the material is uniform. An additional, 3D printed collar or sleeve is placed around the portion made of 8 mm of material. This has a reinforcing and/or stabilizing effect. The two rod portions having a diameter of 6 mm are joined together edge to edge by means of a connection system. A connecting rod is provided which is inserted into the 6 mm tube portion. This connecting element itself is not tubular, but is formed as a polygon, for example having a triangular, quadratic, heptagonal or hexagonal cross section. This connection system can also be re-dismantled without being destroyed.

The rod or tube portions defining the main tension plane are expediently reinforced by two intersecting rod or tube portions or multilayered portions. In a preferred embodiment, two stabilizing elements of this kind are provided, which form a curved 90° cross.

In this case, various sleeve elements are used. The first variant is substantially designed as a tee and receives the end parts of the rod or tube portions of the main tension plane and, at a right angle thereto, the end parts of the stabilizing element. The second variant of the sleeve elements also comprises another sleeve part which incorporates an axis of one of the wings. A housing having a servomotor for driving a toothed wheel is arranged on each sleeve element on the wing side, which toothed wheel interacts with a complementary toothed wheel on the wing in order to be able to adjust said wing. A drive unit, such as a propeller, arranged at the end of the wing can be adjusted together with the wing or, alternatively, independently of the wing setting.

A supporting frame made of carbon fiber material is arranged in the lower intersecting region of the stabilizing elements. This frame comprises openings in side parts, through which openings the two stabilizing elements are arranged so as to intersect one another. Accordingly, the openings are arranged at slightly different heights, in order to be able to guide the stabilizing elements past one another. The support frame is also used to receive a blower, which applies compressed air to the inner region of the envelope. An internal pressure in the magnitude of 100 pascal can be produced. This internal pressure also acts in terms of force on the entire supporting structure and determines the shape thereof.

Furthermore, support feet are connected to the supporting frame, by means of which feet the entire device is placed on the ground. Said feet are resilient, as is conventional, in order to be able to absorb shock. Otherwise, they are as delicate and light as possible, in order to save weight.

The wing comprises a carbon fiber rod as the supporting element. The distribution of mass of the wing including the drive motor is as symmetrical as possible with respect to this rod, in order to prevent a counter torque as far as possible or to keep said torque as small as possible. The servomotor for adjusting the wing is subjected to less load as a result. In a preferred embodiment, the distribution of mass may also be such that if the servomotor fails, the wing automatically moves into a vertical position due to a greater mass in the lower region.

The supporting structure is fastened to the envelope as follows: The envelope is lenticular. A double zipper system is provided on the periphery. An inner and an outer zipper are provided, between which a tunnel is formed. An end point of the two zippers is provided at one point. When the two zippers are opened, the envelope can be folded apart in a shell-like manner and is then interconnected only at the end region of the two zippers. The supporting system having the rods is then inserted successively into the tunnel between the zippers, these zippers then being closed gradually until they are fully closed. At a plurality of points, the sleeve-like connecting pieces are inserted, in accordance with the connections, through the sleeve elements toward the wings or toward the lower supporting structure. For this purpose, an opening is provided past the zipper through the envelope (inwards). At the location at which the sleeve elements are arranged, the zipper is not sewn to the envelope over a specific short distance, so that a gap remains through which the stabilizing elements can be connected to the sleeve elements.

The above-mentioned supporting frame is arranged inside the envelope and comprises outward extending connecting rods, to which a payload carrier body is connected. The payload can be diverse in nature, for example a radio transmitter and/or receiver or a camera or the like.

A helium gas cell is fixed at the top of the envelope in the inner region by means of a series of hook-and-loop fastener elements, so that said gas cell forms evenly and does not move whilst being filled.

The basic flight properties of the aircraft are described in DE 10 2006 028885 A1, mentioned at the outset. The aircraft comprises a preferably circular, lenticular envelope, two wings having, for example, a symmetrical wing profile being attached to the side of the envelope, it being possible for at least one of which wings to be constructed such that both the front and rear part of the wing can be folded by a specific angle and therefore the wings of the hybrid aircraft can adopt both a rotationally symmetrical and a mirror-symmetrical configuration. The incidence of the wings having a symmetrical wing profile, for example, can preferably be adjusted in a controlled manner to the current flight condition by means of the rotary mechanism. Drive units, such as propellers, are arranged at the ends of the wings. The drive units can be brought into an inverse configuration, in which their thrust vectors cause the aircraft to rotate and provide said aircraft with helicopter-like flying properties. The drive units can also be brought into a concordant configuration, in which their thrust vectors point in the same direction and the aircraft is oriented like a conventional wing aircraft. Owing to the gas cell having the lighter-than-air filling, the aircraft also has the properties of a balloon.

The invention will be explained in more detail in the following with reference to an embodiment that is shown schematically in the drawings. In the drawings.

Figure 1:
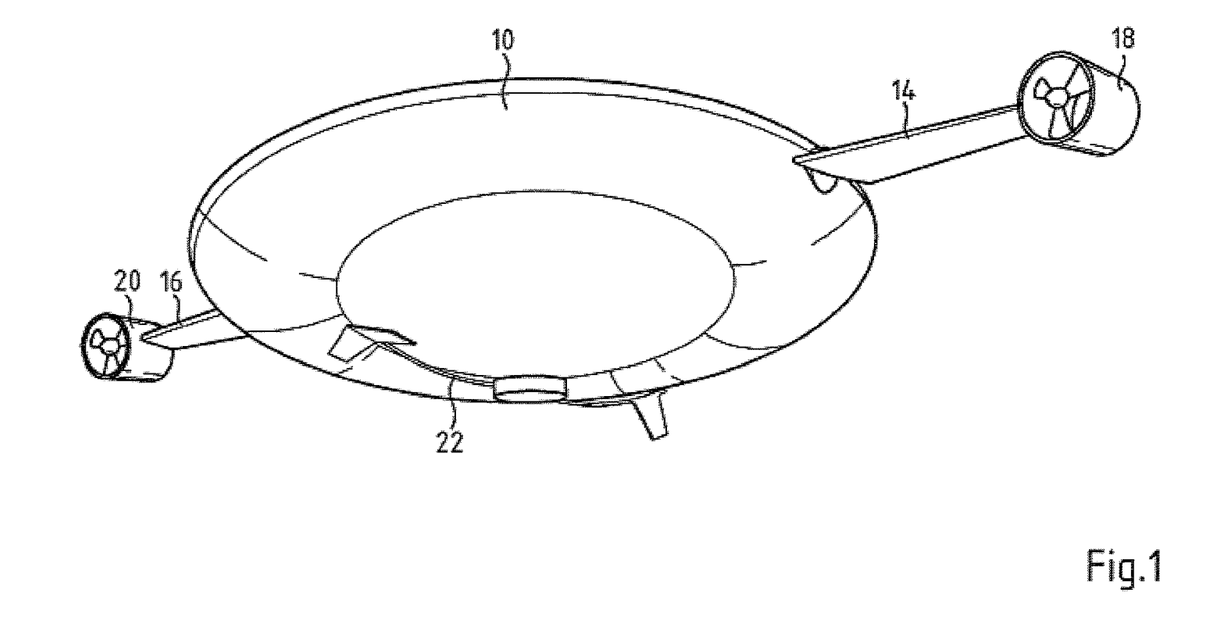
FIG. 1 is a view of an aircraft having an envelope, wings and drives.
Figure 2:
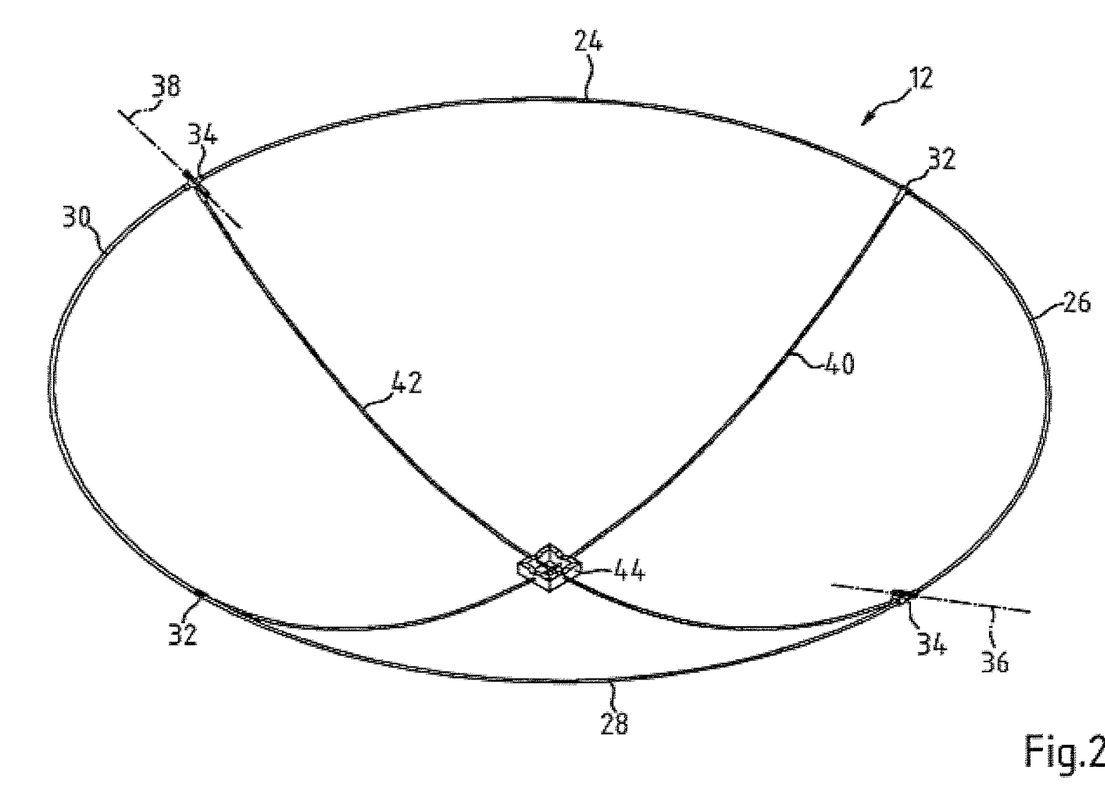
FIG. 2 shows a supporting structure arranged in the envelope of the aircraft according to FIG. 1.

The aircraft shown in FIG. 1 comprises an envelope 10, in which a supporting structure 12 according to FIG. 2 is arranged. Two wings 14, 16 are arranged on the supporting structure 12 so as to be mutually opposing, which wings support propeller drives 18, 20 at the ends thereof, which propeller drives are pivotable about the wing longitudinal axis together with or independently from the wings 14, 16. A payload that can be displaced along a rail 22 that is arranged below the envelope 10 is arranged on the rail 22.

The supporting structure 12 shown in FIG. 2 comprises a plurality of tube or rod portions 24-30, which define a main tension plane for the envelope 10. The tube or rod portions 24-30 are each inserted, by the two end regions thereof, into sleeve elements 32 and 34, respectively, which are shown in detail in FIGS. 3 and 4. The axes of rotation of the wings 14, 16 and/or of the propeller drives 18, 20 are indicated by the dashed lines 36, 38, which extend through sleeve parts of the sleeve elements 34. The ring formed by the rod or tube portions 24-30 is subjected to bending and torsional forces and is therefore stabilized by additional rod or tube portions 40, 42, the end parts of which engage with additional sleeve parts of the sleeve elements 32, 34. A frame part 44 (FIG. 6) is arranged in the intersecting region of the rod or tube portions, which frame part comprises openings for the rod or tube portions 40, 42, so that said portions are fixed in position. Furthermore, a blower (not shown in more detail) is arranged on the frame part 44, by means of which blower the interior of the envelope 10 is inflated.

Figure 3:
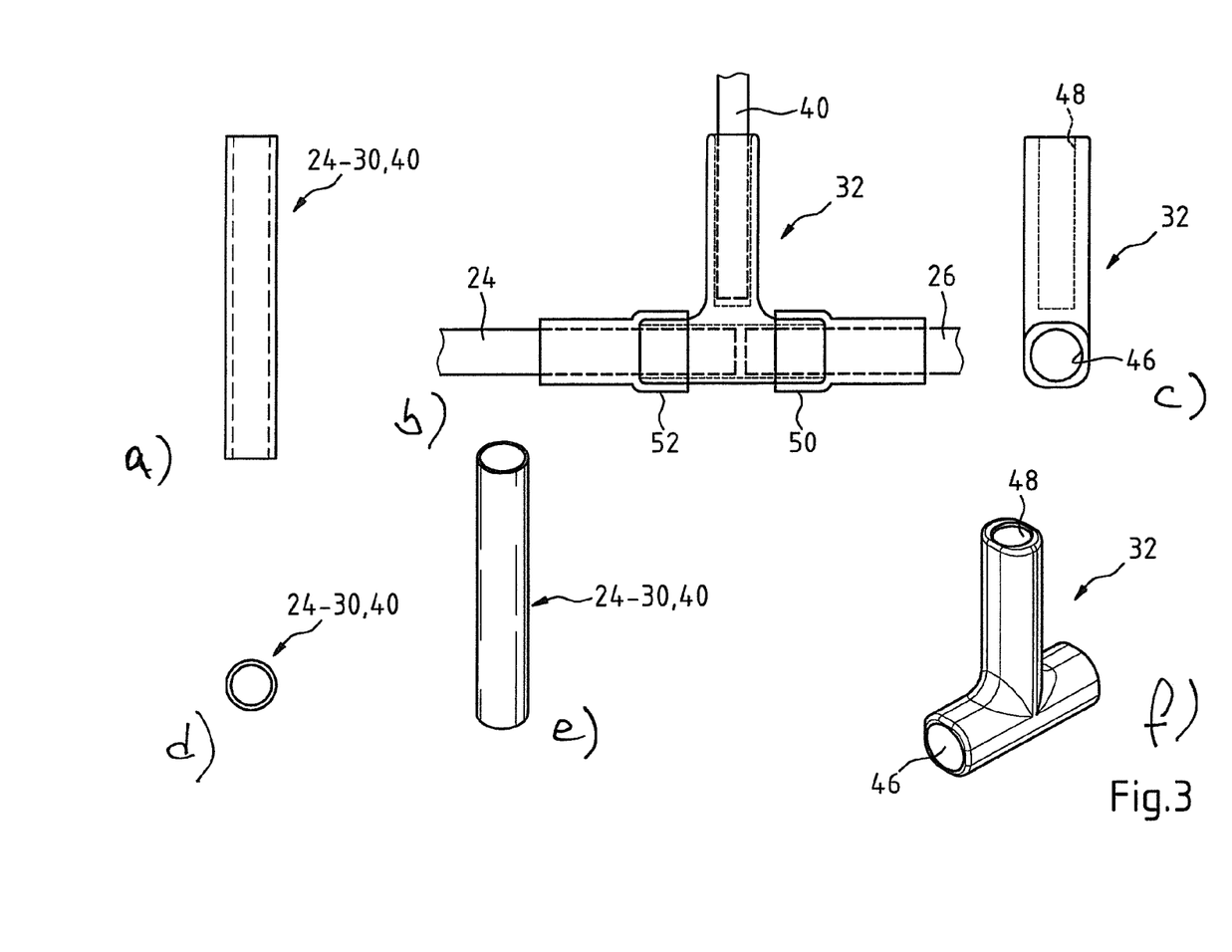
FIG. 3 is a detailed view of a sleeve element of the supporting structure according to FIG. 2.

The sleeve element 32 shown in various views in FIG. 3 is designed as a tee and comprises a first sleeve part 46, into which end regions of the rod or tube portions 24, 26 and 28, 30 are inserted, and a second sleeve part 48, into which an end part of the stabilizing rod or tube portion 40 is inserted. In order to secure the end parts of the rod or tube portions 24, 26 and 28, 30 and/or 40 against sliding out of the sleeve parts 46 or 48, securing sleeves 50, 52 are provided which are arranged on the rod or tube portions 24, 26 and 28, 30 and/or 40 and on the outer side of the sleeve part 46, 48 in a force-locking manner, whereas the rod or tube portions 24, 26 and 28, 30 and/or 40 are arranged in the respective sleeve parts 46, 48 with some backlash, in order to reduce the risk of breakage under changing loads.

Figure 4:
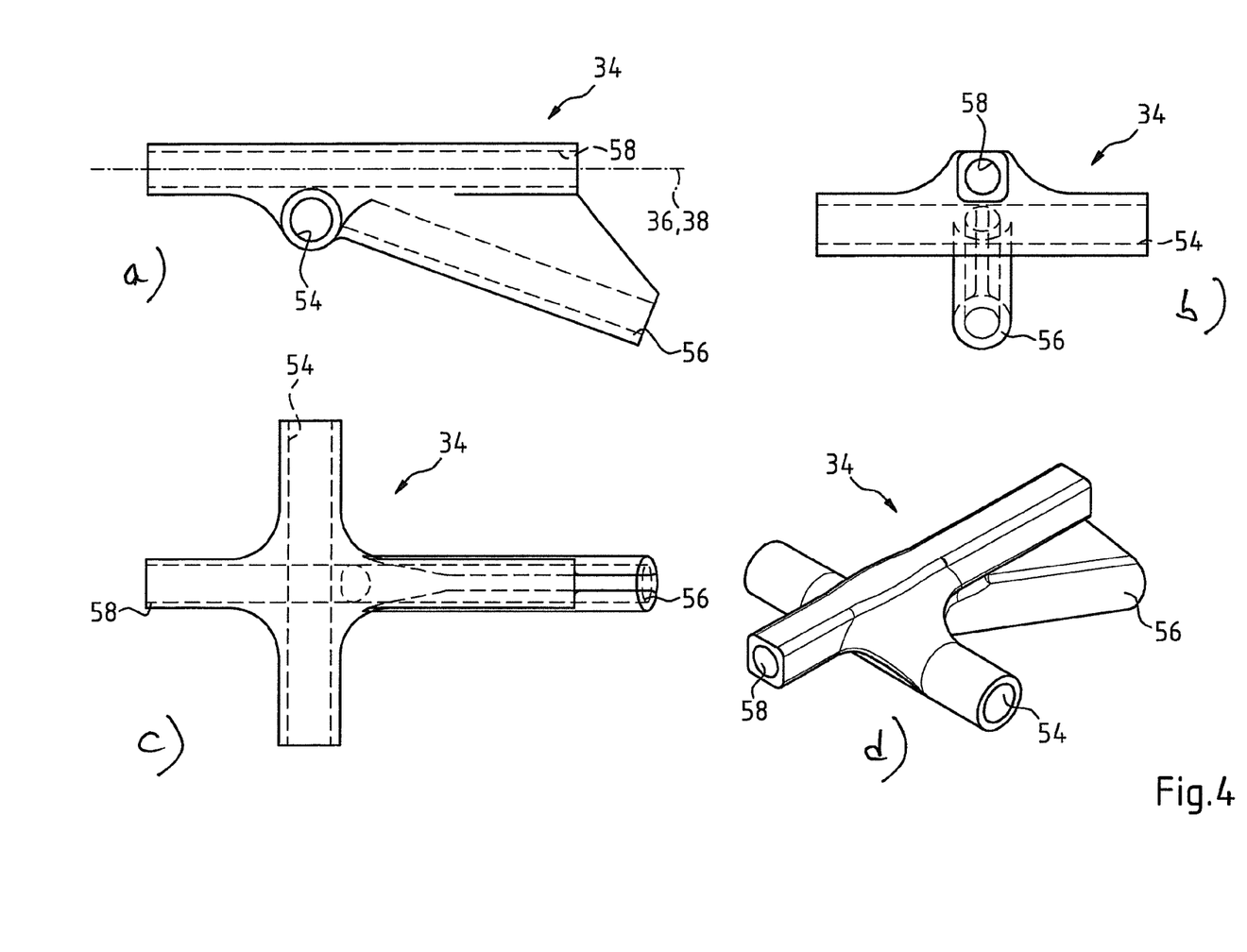
FIG. 4 is a detailed view of an additional sleeve element of the supporting structure according to FIG. 2.

The sleeve element 34 shown in various views in FIG. 4 comprises, like the sleeve element 32, sleeve parts 54 and 56 for receiving the end parts of the rod or tube portions 24-30 and 42, which are also provided with securing sleeves (not shown in more detail here). The sleeve element 34 also comprises a sleeve part 58 through which the support shafts of the wings 14, 16 extend.

Figure 5:
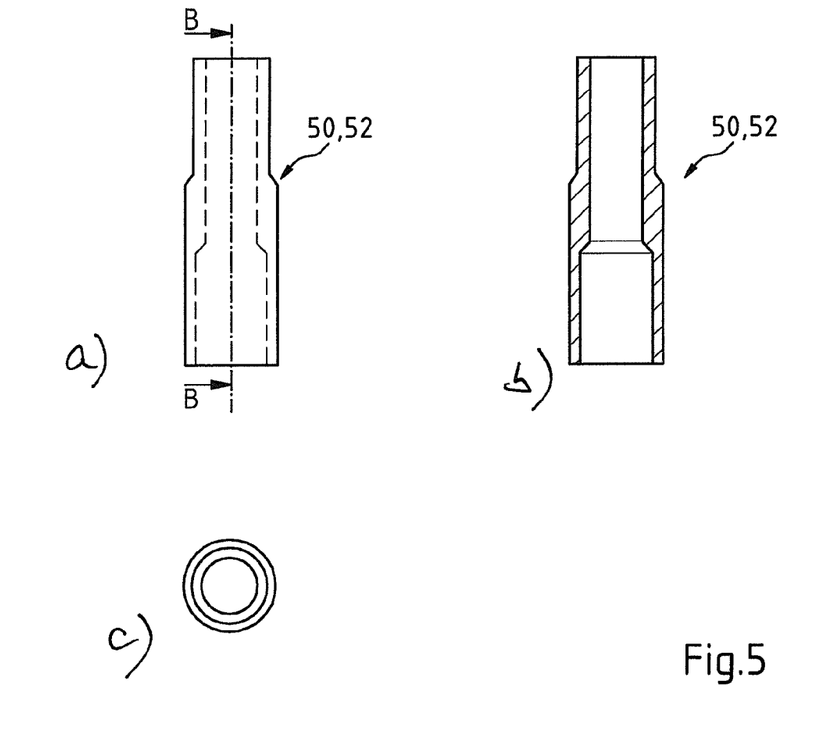
FIG. 5 shows a securing sleeve for the supporting structure according to FIG. 2.

FIG. 5 is a view and a section through the securing sleeve 50, 52.

Figure 6:
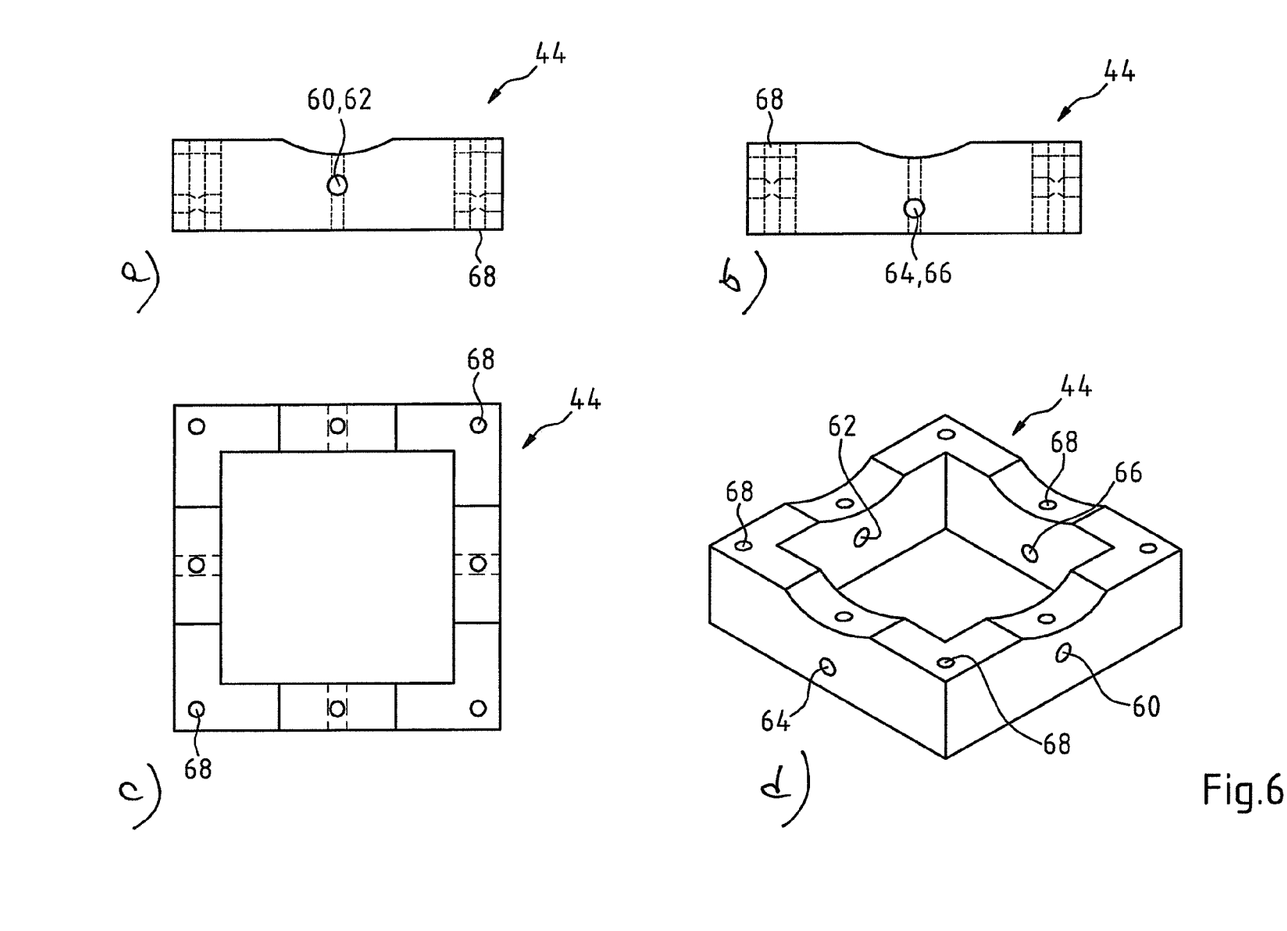
FIG. 6 shows a frame part of the supporting structure according to FIG. 2.

FIG. 6 shows various views of the frame part 44. Openings 60, 62 for the rod or tube portion 42 and openings 64, 66 for the rod or tube portion 40 are provided in the walls of the frame part 44. A plurality of holes 68 penetrating the walls of the frame part 44 are used to fasten the blower (not shown in more detail) and possible additional components, such as electronic control devices or the like.

Figure 7:
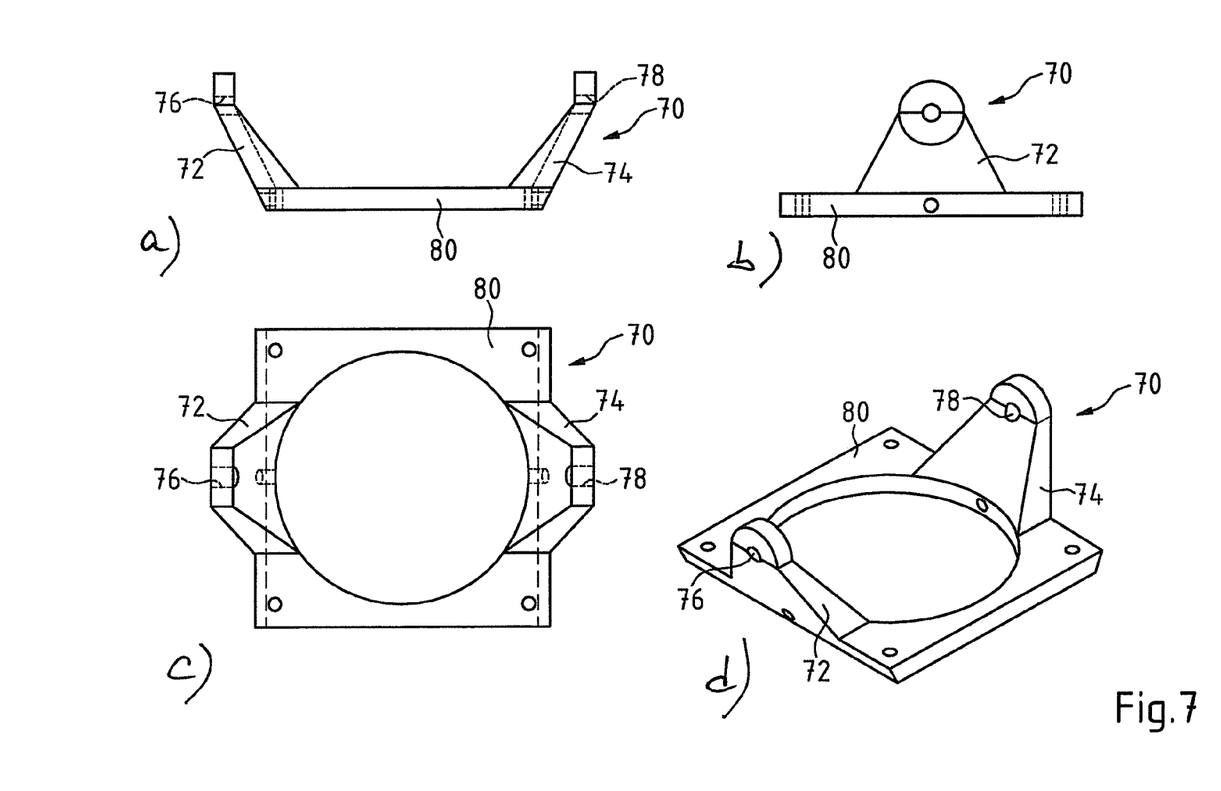
FIG. 7 shows a payload carrier for fastening to the frame part according to FIG. 6.

A payload carrier body 70 shown in various views in FIG. 7 is also arranged on the frame part 44. The payload carrier body 70 also comprises two tabs 72, 74 having holes 76, 78 through which one of the rod or tube portions 40, 42 passes, for example. Payloads of various kinds, such as cameras, radio transmitters and/or receivers and the like, can be fastened to a ground plate 80 of the payload carrier body 70.

Figure 8A:
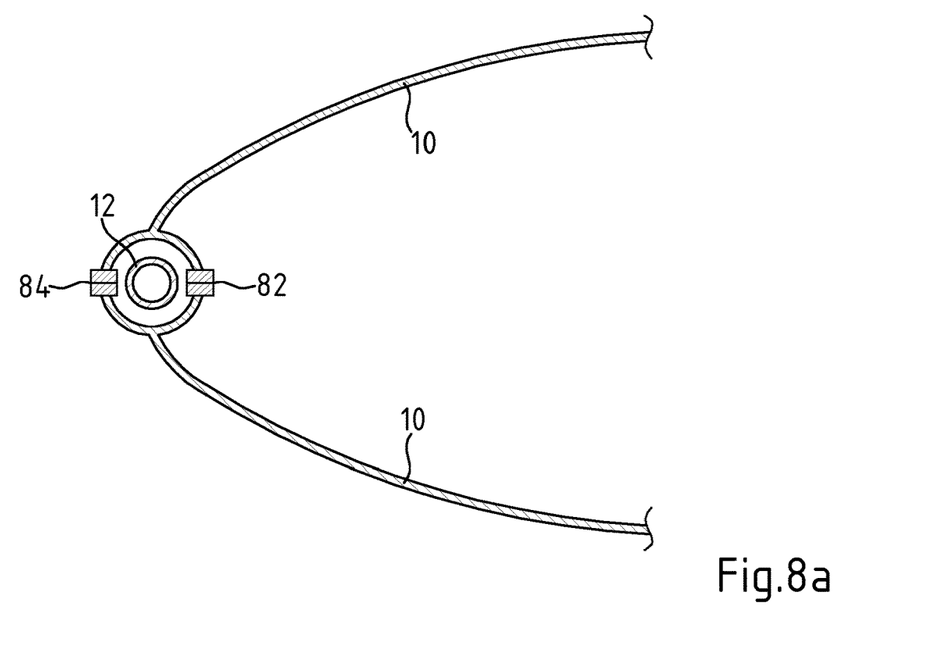
FIG. 8 shows the connection of the upper and lower envelope parts by means of inner and outer zippers, forming a tunnel in which the tubes or rods of the support structure are disposed.
Figure 8B:
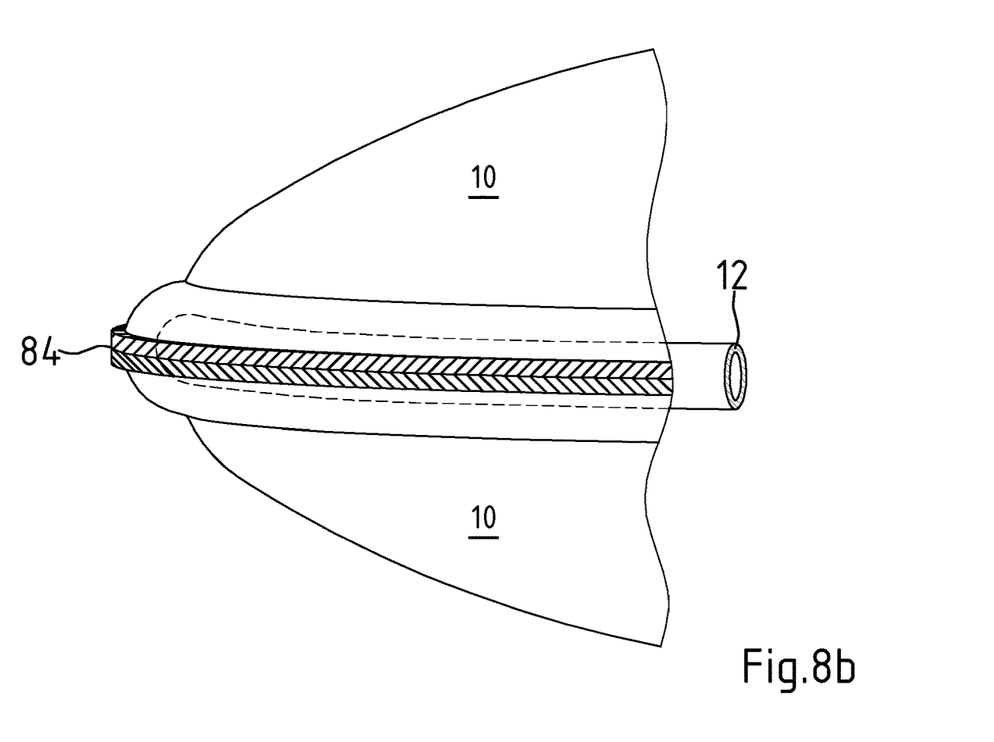

FIGS. 8*a* and *b* show upper and lower parts of the envelope 10, which are connected to each other by means of inner and outer zippers 82, 84. The space between the zippers 82, 84 forms a tunnel in which the tubes or rods of the support structure 10 are disposed.

The envelope 10 preferably comprises two envelope halves that can be interconnected by means of at least one zipper 82, 84, which halves are securely interconnected at a short connection region and can be folded apart in a shell-like manner when the at least one zipper 82,84 is opened.

Furthermore, two zippers 82, 84 that can be actuated in the same or opposite direction are preferably provided, between which zippers 82, 84, when closed, a tunnel is formed for receiving the rod or tube portions 24-30 of the supporting structure 12 defining the main tension plane of the envelope 10.

The supporting structure 12 is fastened to the envelope 10 as follows: The envelope 10 is lenticular. A double zipper system is provided on the periphery. An inner and an outer zipper 82, 84 are provided, between which a tunnel is formed. An end point of the two zippers 82, 84 is provided at one point. When the two zippers 82, 84 are opened, the envelope 10 can be folded apart in a shell-like manner and is then interconnected only at the end region of the two zippers 82, 84. The supporting structure 12 having the rods is then inserted successively into the tunnel between the zippers 82, 84, these zippers 82, 84 then being closed gradually until they are fully closed. At a plurality of points, the sleeve-like connecting pieces are inserted, in accordance with the connections, through the sleeve elements 32, 34 toward the wings 14, 16 or toward the lower supporting structure. For this purpose, an opening is provided past the zipper through the envelope 10 (inwards). At the location at which the sleeve elements 32, 34 are arranged, the zipper is not sewn to the envelope 10 over a specific short distance, so that a gap remains through which the stabilizing elements can be connected to the sleeve elements.

The invention claimed is:

1. An aircraft comprising:
    a supporting structure; and
    an envelope that is tensioned by the supporting structure and can be filled with a gas,
    wherein the supporting structure comprises a plurality of rod or tube portions which define a circular, oval or polygonal main tension plane for the envelope, and
    wherein the envelope comprises two envelope halves that are configured to be interconnected by a first zipper and a second zipper,
    wherein when at least one of the first zipper and the second zipper are opened, the two envelope halves are securely interconnected at a connection region at an end region of the first zipper and the second zipper and can be folded apart in a shell-like manner, and
    wherein when the first zipper and the second zipper are closed, a tunnel is formed between the first zipper and the second zipper, which tunnel receives the rod or tube portions of the supporting structure defining the main tension plane of the envelope.

2. The aircraft according to claim 1, wherein the end parts of the rod or tube portions are detachably fitted together in pairs by means of a plurality of sleeve elements, each of said plurality of sleeve elements comprising at least two sleeve parts.

3. The aircraft according to claim 2, wherein a portion of each sleeve element of the plurality of sleeve elements comprises an additional sleeve part for incorporating an axis of rotation of a wing element that can be adjusted about the axis of rotation and protrudes from an outer periphery of the sleeve element.

4. The aircraft according to claim 2, further comprising a securing sleeve arranged on a respective rod or tube portion of the plurality of rod or tube portions and overlapping a respective sleeve part of the at least two sleeve parts.

5. The aircraft according to claim 1 wherein the plurality of rod or tube portions comprise at least two intersecting rod or tube portions configured to stabilize the main tension plane, and the aircraft further comprises a frame part arranged in an intersecting region of the at least two intersecting rod or tube portions, which frame part comprises openings for the at least two intersecting rod or tube portions.

6. The aircraft according to claim 5, wherein a blower is arranged on the frame part, which blower applies compressed air to the interior of the envelope.

7. The aircraft according to claim 5, wherein functional components are arranged on the frame part.

8. The aircraft according to claim 1, wherein the plurality of rod or tube portions comprise a carbon fiber material.

9. The aircraft according to claim 1, wherein the envelope is made of an air-impermeable, tear-resistant synthetic fabric material.

10. The aircraft according to claim 1, wherein a communication antenna is incorporated into the material of the envelope or is deposited or rolled thereon.

11. An assembly comprising a plurality of aircraft according to claim 1, wherein the plurality of aircraft are coupled to one another.

12. The assembly according to claim 11, wherein the plurality of aircraft are coupled to one another by ropes, cables or a planar solar element.

13. An assembly comprising the aircraft according to claim 1 and ropes or cables anchoring the aircraft to the ground, in order to monitor a limited region by means of optical and/or electromagnetic devices arranged on the aircraft.

* * * * *